United States Patent
Sells

(10) Patent No.: US 7,561,404 B2
(45) Date of Patent: *Jul. 14, 2009

(54) BIASED-MOSFET ACTIVE BRIDGE

(75) Inventor: Troy Woodrow Sells, Palm Bay, FL (US)

(73) Assignee: Harris Corporation, Melbourne, FL (US)

(*) Notice: Subject to any disclaimer, the term of this patent is extended or adjusted under 35 U.S.C. 154(b) by 260 days.

This patent is subject to a terminal disclaimer.

(21) Appl. No.: 11/285,566

(22) Filed: Nov. 22, 2005

(65) Prior Publication Data

US 2007/0115706 A1 May 24, 2007

(51) Int. Cl.
*H02H 11/00* (2006.01)
(52) U.S. Cl. .................................... 361/246
(58) Field of Classification Search ............... 361/77, 361/246; 307/127
See application file for complete search history.

(56) References Cited

U.S. PATENT DOCUMENTS

| | | | | |
|---|---|---|---|---|
| 3,839,679 | A * | 10/1974 | Hughes | 327/336 |
| 4,139,880 | A | 2/1979 | Ulmer et al. | |
| 4,420,786 | A * | 12/1983 | Toney | 361/77 |
| 4,423,456 | A | 12/1983 | Zaidenweber | |
| 4,616,305 | A * | 10/1986 | Damiano et al. | 363/132 |
| 5,012,381 | A * | 4/1991 | Elliott et al. | 361/84 |
| 5,148,064 | A * | 9/1992 | Kevorkian et al. | 327/427 |
| 5,307,403 | A * | 4/1994 | Reichelt | 379/286 |
| 5,623,550 | A | 4/1997 | Killion | |
| 5,659,265 | A * | 8/1997 | Ludwig et al. | 327/530 |
| 5,870,031 | A | 2/1999 | Kaiser et al. | |
| 5,991,182 | A | 11/1999 | Novac et al. | |
| 6,380,721 | B2 * | 4/2002 | Pattamatta et al. | 323/269 |
| 6,462,929 | B2 * | 10/2002 | Compton et al. | 361/246 |
| 6,751,077 | B2 * | 6/2004 | Gossner | 361/56 |

OTHER PUBLICATIONS

"250V-P-Channel Enhancement Mode MOSFET", Issue 1, Mar. 2001, ZETEX.

* cited by examiner

*Primary Examiner*—Danny Nguyen
*Assistant Examiner*—Tien Mai
(74) *Attorney, Agent, or Firm*—Darby & Darby PC; Robert J. Sacco

(57) ABSTRACT

A transistor active bridge circuit (100) provides operation and protection for devices from the effects of battery polarity reversal. The circuit includes first and second field-effect transistors (102, 104) of a first channel type, and third and fourth field-effect transistors (106, 108) of a second channel type that is different from the first channel type. A set of voltage dividers (110, 112, 114, 116, 118, 120, 122, 124) and voltage clamping devices (126, 128, 130, 132) permit the circuit (100) to efficiently operate over a wider range of input voltages, without potential damage to the field-effect transistors.

10 Claims, 3 Drawing Sheets

BIASED-MOSFET ACTIVE BRIDGE

STATEMENT REGARDING FEDERALLY SPONSORED RESEARCH OR DEVELOPMENT

This invention was constructed on Government Contract No. PA180C. The government has certain rights in the invention.

BACKGROUND OF THE INVENTION

1. Statement of the Technical Field

The inventive arrangements relate to MOSFET circuits, and more particularly to a circuit for battery reversal operation and protection.

2. Description of the Related Art

Batteries are used as power sources in a wide variety of devices. Typically, these batteries are designed for user replacement. Although batteries are generally not difficult to replace, there is at least one potential installation error that can cause serious damage to equipment. Specifically, installation of a battery with the polarity reversed. This situation occurs when the positive terminal of the battery is connected to the negative power terminal of the equipment, and the negative terminal is connected to the positive power terminal of the device. Such an occurrence can prevent a system from operating and may cause damage to the equipment.

Various circuits have been proposed that provide operating and protection for circuitry from battery polarity reversal. For example, U.S. Pat. No. 4,139,880 to Ulmer et al. al., U.S. Pat. No. 4,423,456 to Zaidenweber, and U.S. Pat. No. 5,623,550 to Killion, each disclose a battery reversal operation and protection circuit. In general, each of these circuits is designed to provide a battery operated piece of equipment with proper power polarity, regardless of the way in which the battery is connected to the battery terminals of the equipment. In general, the circuits disclosed in the foregoing references are bridge rectifier type devices. However, rather than simply utilizing diodes, the circuits use either CMOS or MOSFET components to perform the rectification function.

One reason for utilizing CMOS or MOSFET type components for rectification is simply convenience. Where a device generally utilizes CMOS or MOSFET devices, it can be more convenient to use similar CMOS or MOSFET type components in the battery polarity reversal protection circuit. However, MOSFET devices in these applications can have other advantages as well. For example, the semiconductors used in bipolar devices can result in a significant variable voltage drop across the battery reversal circuit. This can be a problem for low power systems where low voltage drop and low power loss is desirable.

Despite the advantages offered by such MOSFET circuits that allow devices to operate with battery polarity reversed, they still suffer from certain drawbacks. For example, all of the referenced circuits have a rather limited input voltage operating range. This is due to the fact that for most MOSFET devices, the maximum voltage that can be applied between the gate and the source is rather limited. Gate to source voltages that exceed a specified value $V_{gs\_max}$ can damage the MOSFET components. This can be a problem with existing designs because practically the full value of the battery voltage will be applied across the gate to source terminals of the MOSFET. For example, in U.S. Pat. No. 4,139,880 to Ulmer et al. al., U.S. Pat. No. 4,423,456 to Zaidenweber, and U.S. Pat. No. 5,623,550 to Killion, the full value of the input voltage will be present between the gate and source terminals.

SUMMARY OF THE INVENTION

The invention concerns a transistor active bridge circuit. The circuit is connectable between a pair of input lines and a pair of output lines to ensure that a load receives a proper polarity voltage regardless of whether a battery for powering a load is properly installed. The transistor active bridge circuit includes first and second field-effect transistors of a first channel type. A source-drain path of the first field effect transistor is connected in series with a source-drain path of the second field effect transistor. The series connected transistor pair form a first series transistor combination that is connected across the input lines. The transistor active bridge circuit also includes third and fourth field-effect transistors of a second channel type, different from the first channel type. A source-drain path of the third field effect transistor is connected in series with a source-drain path of the fourth field effect transistor to form a second series transistor combination connected across the input lines. A first one of the output lines can be connected to the first series combination at an interconnection point between the first and the second field effect transistors. A second one of the output lines can be connected to the second series combination at an interconnection point between the third and fourth field effect transistors.

A voltage divider circuit is provided for each of the field effect transistors. The voltage divider circuit can be comprised of a first resistor and a second resistor. The first and second resistors are connected in series from a source of each field-effect transistor to one of the input lines. A bias voltage tap can be provided at a connection point between the first and second resistors. The bias voltage tap of each voltage divider is connected to a gate of each respective one of the field effect transistors. According to one aspect of the invention, the drain of each one of the field effect transistors can be connected to a first one of the input lines, the source of each one of the field-effect transistors can be connected to the first resistor, and the second resistor can be connected to a second one of the input lines.

Applying voltage to the active bridge circuit will cause current to flow through the forward biased body diodes of the field effect transistors. This current generates a voltage at the bias voltage tap when it flows through the voltage divider circuit. The voltage derived from the bias voltage tap is used for biasing each transistor to an "on" state in which current can flow between the drain and source. Turning on the field effect transistor shorts the body diode, leaving only a small resistance between the drain and source as current flows through a conductive channel formed by the transistor. The voltage divider circuit also ensures that the voltage between the gate and the source is reduced relative to the input voltage. This ensures operation of the transistor active bridge circuit over a wider range of input voltages without risk of damage to the transistors. In this regard, the transistor active bridge circuit can also include a zener diode connected between the gate and the source of each respective one of the field-effect transistors. The zener diode can be provided to serve as a further means for ensuring that the voltage between the gate and source terminals is limited.

DETAILED DESCRIPTION OF THE PREFERRED EMBODIMENTS

Figure 1:
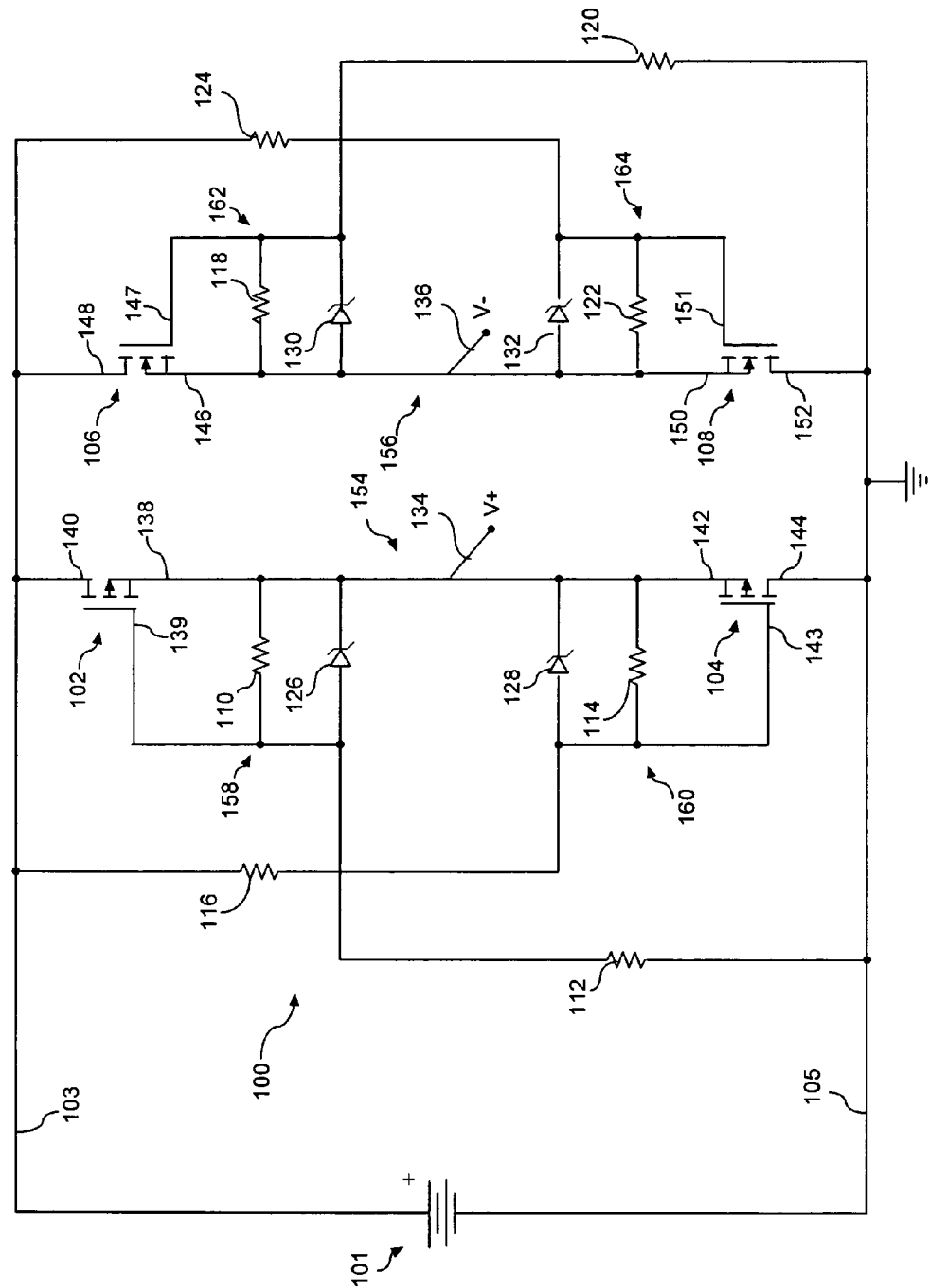
FIG. 1 is a schematic representation of a transistor active bridge circuit.

A transistor active bridge circuit 100 is shown in FIG. 1. The circuit 100 shown is useful for a variety of purposes, including operating and protecting devices in the event of a battery polarity reversal. As may be observed in FIG. 1, circuit 100 is connectable between a pair of input lines 103, 105 and a pair of output lines 134, 136 to ensure that a load receives a proper polarity voltage regardless of whether a power source 101 provided for powering a load (not shown) is properly installed.

Circuit 100 includes first and second field-effect transistors 102, 104 of a first channel type. The transistor active bridge circuit also includes third and fourth field-effect transistors 106, 108 of a second channel type that is different from the first channel type. For example, the first and second field effect transistors 102, 104 can be P-channel type whereas the third and fourth field effect transistors 106, 108 can be N-channel type. According to an embodiment of the invention, each of the field effect transistors can be enhancement mode devices. For example the P-channel type transistor can be model number ZVP4525E6, which is available from Zetex, Inc. of Commack, N.Y. The N-channel device can be ZVN4525E6, which is also available from Zetex, Inc. Still, it should be understood that the invention is not limited in this regard. Other types of field effect transistors can also be selected depending upon the anticipated voltage and current handling requirements of circuit 100.

Figure 2:
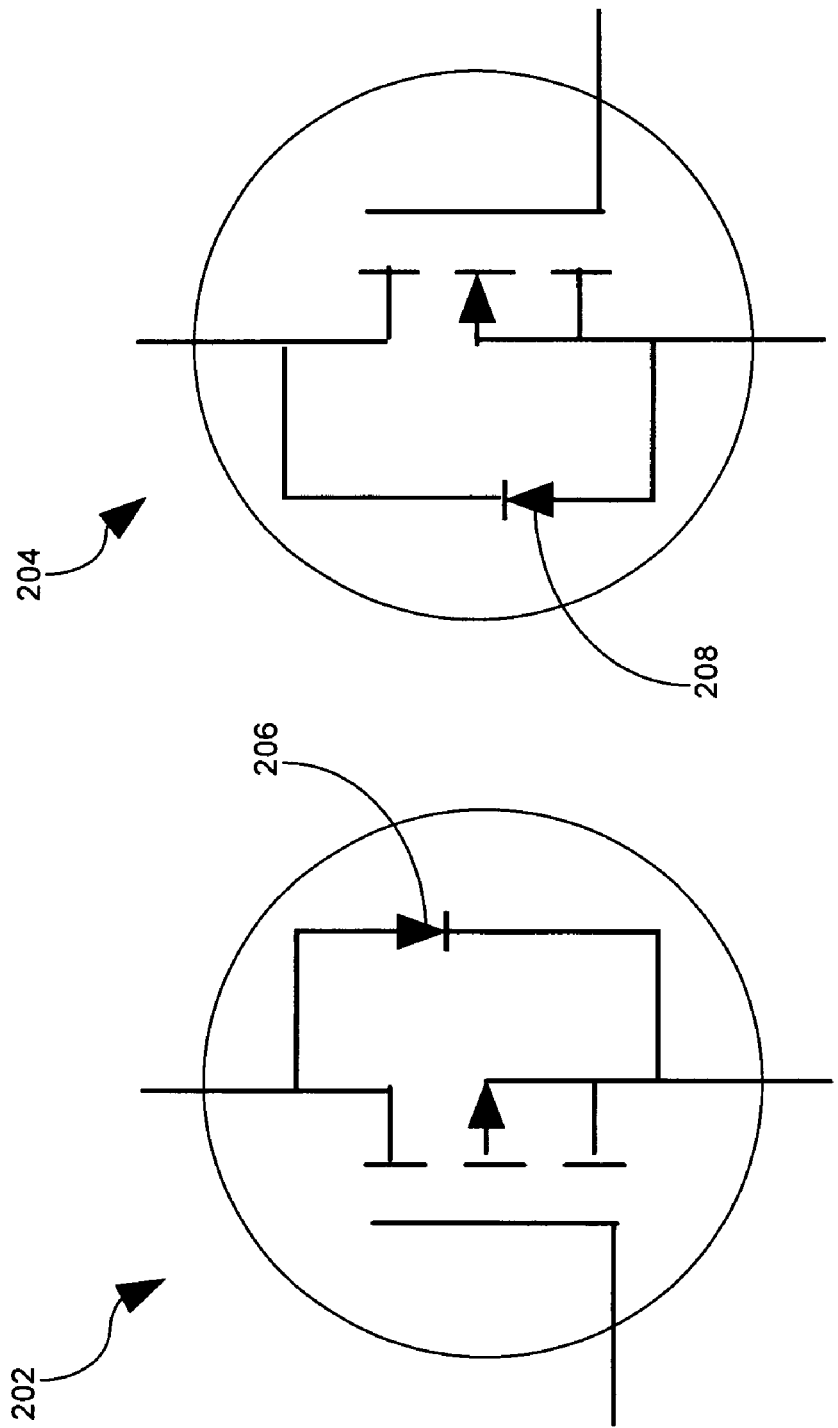
FIG. 2 is a schematic representation of a MOSFET device showing an intrinsic body diode.

As will be understood by those skilled in the art, each of field effect transistor 102, 104, 106, 108 will have three terminals respectively defined as a source, gate and drain. With regard to field effect transistor 102, the source, gate and drain terminals are respectively identified with reference numbers 138, 139, and 140. With regard to field effect transistor 104, the source, gate and drain terminals are respectively identified with reference numbers 142, 143, and 144. The source gate and drain terminals of transistor 106 and 108 are respectively identified as 146, 147 and 148 and 150, 151, 152. An electrical path can be provided from the source to the drain of each field effect transistor 102, 104, 106, 108. This path is generally referred to herein as the source-drain path. Although not always shown in schematic illustrations, field-effect transistor devices, such as MOSFETs typically have an intrinsic body diode that results from the manner in which the devices are manufactured. This intrinsic body diode 206, 208 is illustrated in FIGS. 2A and 2B for a P-channel 202 and N-channel device 204. The importance of this body diode will become clear in the discussion below regarding the detailed operation of the circuit.

Referring again to FIG. 1, it can be observed that a source-drain path of first field effect transistor 102 can be connected in series with a source-drain path of the second field effect transistor 104. The series connected transistor pair 102, 104 form a first series transistor combination that can be connected across the input lines 103, 105. A source-drain path of the third field effect transistor 106 can be connected in series with a source-drain path of the fourth field effect transistor 108 to form a second series transistor combination connected across the input lines 103, 105.

The circuit 100 can have an output defined by output lines 134, 136. A first one of the output lines 134 can be connected to the first series combination 102, 104 at an interconnection point 154 between the first and the second field effect transistors 102, 104. A second one of the output lines 136 can be connected to the second series combination 106, 108 at an interconnection point 156 between the third and fourth field effect transistors 106, 108.

A voltage divider circuit can be provided for each of the field effect transistors 102, 104, 106, 108. According to one embodiment of the invention, the voltage divider circuit can be comprised of a first resistor and a second resistor connected in series. However, the invention is not limited in this regard. Instead, those skilled in the art will appreciate that numerous different types of voltage dividers circuits are possible and can be used for the purposes as hereinafter described. The voltage divider circuit for the first field effect transistor 102 can include first resistor 110 and second resistor 112. The voltage divider circuit for the second field effect transistor 104 can include first resistor 114 and a second resistor 116. Similarly, the voltage divider circuit for the third and fourth field effect transistors 106, 108 can include first resistors 118, 122 and second resistors 120, 124.

In FIG. 1, the first and second resistors are connected in series from a source of each field-effect transistor to one of the input lines. For example, the resistor combination 110, 112 is connected to source 138 of field effect transistor 102 to input line 105. The resistor combination 114, 116 is connected to source 142 of field effect transistor of 106 to input line 103. Each voltage divider advantageously provides a bias voltage tap 158, 160, 162, and 164. For example, if a resistive voltage divider is used as shown in FIG. 1, then the bias voltage tap can be provided at a connection point between the first and second resistors. The bias voltage tap 158, 160, 162, 164 of each voltage divider is connected to a gate 139, 143, 151, 147 of each respective one of the field effect transistors. Consequently, the bias voltage tap 158, 160, 162, 164 advantageously provides a substantially reduced voltage output relative to the input voltage applied to the voltage divider circuit 100 by power source 101. For example, the bias voltage tap of the voltage divider can provide an output that is reduced by 10% to 90% relative to the input voltage.

Notably, the invention is not limited to any particular range of voltage reduction by the voltage divider. The purpose of the voltage divider is to permit a relatively larger range of input voltages to be applied across input lines 103, 105 without producing excessively high voltage levels between the gate and source of each field effect transistor. However, the voltage divider should still produce a bias voltage between each transistor gate 139, 143, 147, 151 and a respective source 138, 142, 146, 150 that is of sufficient magnitude to self bias each transistor for a predetermined range of input voltage applied across the input lines 103, 105. According to one embodiment, the first resistor 110, 114, 118, 122 can be selected to be about 187 kΩ and the second resistor 112, 116, 120, 124 can be selected to be about 604 kΩ. This combination will provide a voltage reduction of about 30%. Still, those skilled in the art will appreciate that the invention is not limited in this regard. A variety of other voltage divider values can and should be used depending upon the design criteria for input voltage range, current draw, and transistor specifications.

Circuit 100 can also include a voltage clamping circuit to ensure that the voltage applied across each of the field effect transistors does not become excessively large as the input voltage increased. Any suitable voltage clamping circuit can be used for this purpose. For example, the voltage clamp could be simply implemented as a zener diode 126, 128, 130, 132 that is connected in parallel with first resistor 110, 114, 118, 122 between the gate and the source of each respective one of the field-effect transistors 102, 104, 106, 108. The polarity of each zener diode 126, 128, 130, 132 should be as shown in FIG. 1 so that a reverse bias voltage will appear across respective ones of the zener diodes when the associated field effect transistor 102, 104, 106, 108 is biased to its "on" state.

The zener diodes 126, 128, 130, 132 can ensure that the voltage between the gate and source terminals is limited. For example, the zener diode can prevent the voltage between the gate and source of each field effect transistor 102, 104, 106, 108 from exceeding a predetermined threshold voltage defined by the reverse breakdown voltage of the zener diode. A further advantage of using a voltage clamp as described herein is it allows adequate bias voltage levels to be developed between the gate 139, 143, 147, 151 and the source 138, 142, 146, 150, of each field effect transistor 102, 104, 106, 108, even with relatively low input voltages across lines 103, 105. For example, the voltage divider can be designed to allow a relatively large proportion of the input voltage (e.g. 70%) to appear at bias voltage tap 158, 160, 162, 164. The larger proportion of voltage ensures that the field effect transistors will be biased to their on state, even with relatively low input voltages from power source 101. In order to ensure that this larger proportion of voltage does not damage the field effect transistors when considerably higher input voltages are applied to the circuit 100, the clamping circuit (zener diode 126, 128, 130, 132 in FIG. 1) can clamp the output of the voltage divider at a predetermined level.

The operation of the circuit 100 will now be described in greater detail. When input line 103 is positive relative to input line 105, an intrinsic body diode associated with each of the field-effect transistors 102 and 108 will be forward biased and current will begin to flow between the drain and source of these devices. This will produce a voltage at bias voltage tap 158, 164 as current begins to flow through the voltage divider circuits associated with the respective field-effect transistors 102, 108. The voltage produced at the voltage tap 158, 164 can be used to self bias the field effect transistors 102, 108, thereby switching these transistors to their "on" state. When switched to their on state, a relatively low resistance path is created between drain 140, 152 and source 138, 150 of field-effect transistors 102, 108. The exact amount of this resistance will depend upon several factors, including the specified drain-source on state resistance of the field effect transistors. For example "on" state resistance values of between 0.5 mΩ and 10Ω are typical for such devices. Generally P channel devices have a slightly higher resistance as compared to N channel devices. Once turned on, however, current will continue to flow between the drain and source of transistors 102, 108 through the low resistance path, thereby eliminating the voltage drop associated with the body diode. Consequently, if a load is connected across output lines 134, 136 the voltage drop caused by the bridge circuit can be considerably less than the typical diode drop associated with a conventional diode bridge. In this regard, it may be noted that in a conventional diode bridge circuit, the output voltage drop will include two diode drops. Accordingly, the voltage drop in a conventional diode bridge can be in the range from 1.2V to 1.6V.

If the input voltage applied across input lines 103, 105 is sufficiently high, it will exceed a reverse breakdown voltage of zener diodes 126, 132. This will cause the zener diodes to clamp the voltage applied across the gate to source terminals of each field effect transistor 102, 106. When the input voltage polarity is reversed, field-effect transistors 102, 108 will be switched off, and field effect transistors 104, 106 will turn on in a manner similar to that described above.

Figure 3:
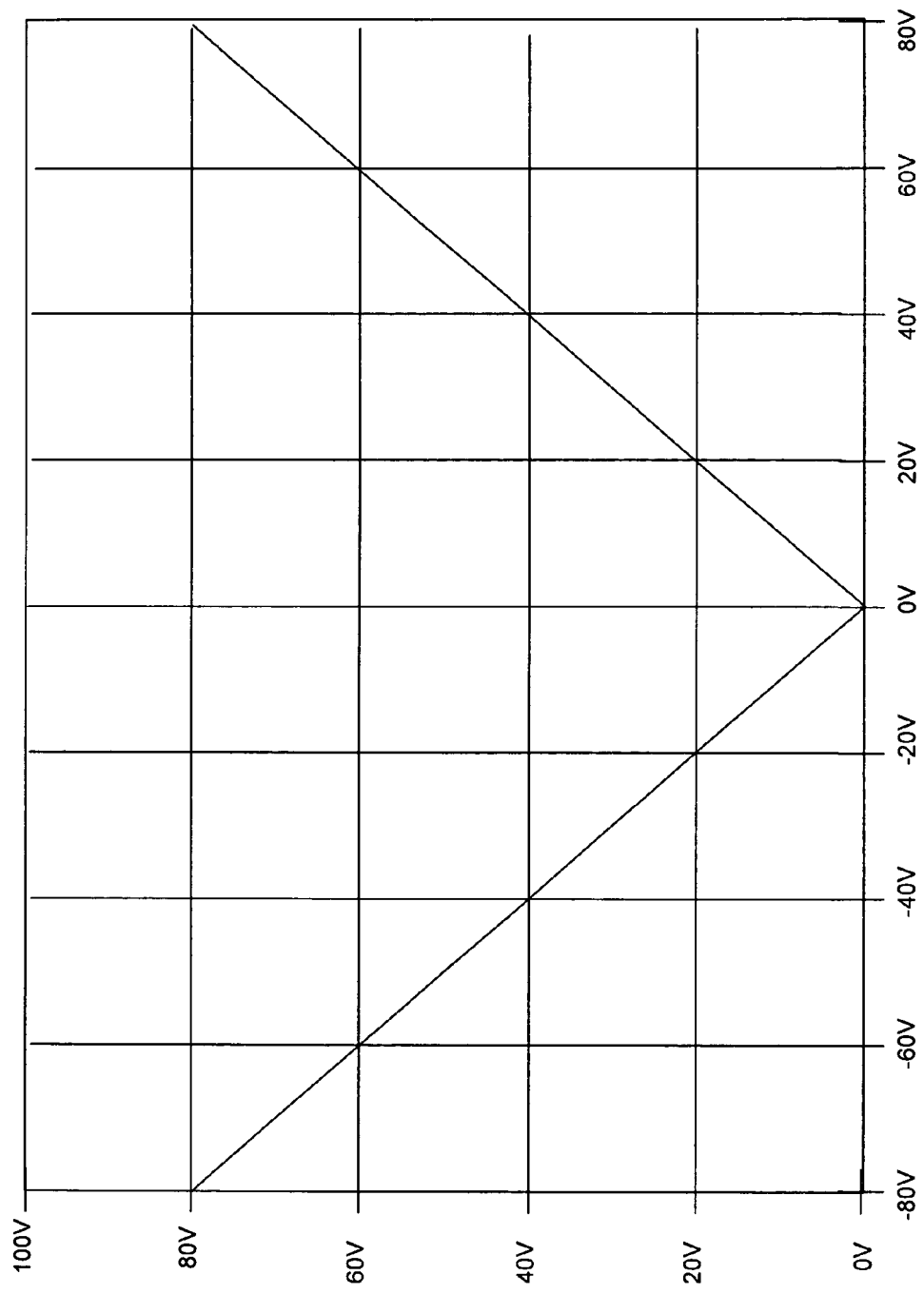
FIG. 3 shows a plot of input voltage versus output voltage for the active bridge circuit in FIG. 1.

Referring now to FIG. 3, there is provided a plot derived from a computer model of the circuit 100. The plot shows input voltage on the X axis versus output voltage on the Y axis for the active bridge circuit in FIG. 1. As can be observed from FIG. 3, the output voltage always has the same polarity regardless of the input voltage polarity. There is a small non-linearity in the output voltage from the circuit that appears around 0V. This non-linearity is not shown in FIG. 3. However, it should be understood that the non-linearity does not affect the voltage polarity at the output terminals and therefore is not important for the purpose of the present disclosure.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

A number of references are cited herein, the entire disclosures of which are incorporated herein, in their entirety, by reference for all purposes. Further, none of these references, regardless of how characterized above, is admitted as prior to the invention of the subject matter claimed herein.

I claim:

1. A discrete transistor active bridge circuit connectable between a pair of input lines and a pair of output lines for protecting devices from the effects of battery polarity, said discrete transistor active bridge circuit, comprising:

first and second field-effect transistors of a first channel type, a source-drain path of said first field effect transistor connected in series with a source-drain path of said second field effect transistor to form a first series transistor combination connected across said input lines;

third and fourth field-effect transistors of a second channel type, a source-drain path of said third field effect transistor connected in series with a source-drain path of said fourth field effect transistor to form a second series transistor combination connected across said input lines;

said first, second, third and fourth field-effect transistors connected to automatically provide a predetermined voltage polarity at said pair of output lines regardless of a voltage polarity applied at said pair of input lines coupled to a power supply;

a voltage divider provided for each of said field-effect transistors, said voltage divider comprised of a first resistor connected between sources of at least two of said field-effect transistors and a gate of a first one of said at least two field-effect transistors and a second resistor connected in series with said first resistor from said sources of said at least two of said field-effect transistors directly to a first input line of said input lines, wherein said first input line has a first voltage polarity opposite a second voltage polarity of a second input line of said input lines, and said second input line is directly coupled to a drain of said first one of said at least two field-effect transistors;

a bias voltage tap defined at a connection point between said first and second resistors connected to said gate of each of said field-effect transistors; and a plurality of voltage clamping devices, each respectively connected between said gate and said source of one of said first, second, third and fourth field-effect transistors, wherein each of said voltage clamping device performs a dual function of providing protection to said gate of each respective one of said field-effect transistors, and allowing an adequate bias voltage level to be developed between said gate and said source of said respective field-effect transistor when a voltage across said input lines is less than a predetermined value;

wherein each of said first, second, third, and fourth field-effect transistors is a power MOSFET that is self biased through an intrinsic body diode, said intrinsic body diodes of the field-effect transistors arranged (a) to allow said first and fourth field-effect transistors to turn on at a first polarity state of an input voltage source while blocking bias currents for said second and third field-effect transistors at said first polarity state, and (b) to allow said second and third field-effect transistors to turn on at a second polarity state of said input voltage source while blocking bias currents for said first and fourth field-effect transistors at said second polarity state.

2. The transistor active bridge circuit of claim 1, wherein said voltage clamping device is a zener diode connected between said gate and said source of each respective one of said field-effect transistors.

3. The transistor active bridge circuit of claim 1, wherein said pair of output lines further comprises a first output line connected to said first series combination at an interconnection point between said first and said second field-effect transistors, and a second output line connected to said second series combination at an interconnection point between said third and fourth field-effect transistors.

4. The transistor active bridge circuit of claim 1, wherein a drain of each one of said field-effect transistors is connected to a first one of said input lines, said source of each one of said field-effect transistors is connected to said first resistor, and said second resistor is connected to a second one of said input lines.

5. The transistor active bridge circuit of claim 1, wherein said first channel type is different from said second channel type.

6. A discrete transistor active bridge circuit connectable between a pair of input lines and a pair of output lines for protecting devices from the effects of battery polarity, said discrete transistor active bridge circuit, comprising:

first and second field-effect transistors of a first channel type, a source-drain path of said first field-effect transistor connected in series with a source-drain path of said second field-effect transistor to form a first series transistor combination connected across said input lines;

third and fourth field-effect transistors of a second channel type different from said first channel type, a source-drain path of said third field-effect transistor connected in series with a source-drain path of said fourth field-effect transistor to form a second series transistor combination connected across said input lines;

said first, second, third and fourth field-effect transistors connected to automatically provide a predetermined voltage polarity at said pair of output lines regardless of a voltage polarity at said pair of input lines coupled to a power supply;

a voltage divider provided for each of said field-effect transistors, said voltage divider comprised of a first resistor connected between sources of at least two of said field-effect transistors and a gate of a first one of said at least two field-effect transistors and a second resistor connected in series with said first resistor from sources of said at least two field-effect transistors directly to a first input line of said input lines, wherein said first input line has a first voltage polarity opposite a second voltage polarity of a second input line of said input lines, and said second input line is directly coupled to a drain of said first one of said at least two field-effect transistors;

an output tap of each said voltage divider configured for providing an output voltage that is reduced relative to an input voltage applied to each said voltage divider, each said output tap respectively connected to a said gate of each of said field-effect transistors; and a plurality of voltage clamping devices, each respectively connected between said gate and said source of one of said first, second, third and fourth field-effect transistor, wherein each of said voltage clamping devices performs a dual function of providing protection to said gate of each respective one of said field-effect transistors, and allowing an adequate bias voltage level to be developed between said gate and said source of said respective field-effect transistor when a voltage across said input lines is less than a predetermined value;

wherein each of said first, second, third, and fourth field-effect transistors is a power MOSFET that is self biased through an intrinsic body diode, said intrinsic body diodes of the field-effect transistors arranged (a) to allow said first and fourth field-effect transistors to turn on at a first polarity state of an input voltage source while blocking bias currents for said second and third field-effect transistors at said first polarity state, and (b) to allow said second and third field-effect transistors to turn on at a second polarity state of said input voltage source while blocking bias currents for said first and fourth field-effect transistors at said second polarity state.

7. A discrete transistor active bridge circuit connectable between a pair of input lines and a pair of output lines for protecting devices from the effects of battery polarity, said discrete transistor active bridge circuit, comprising:

a field-effect transistor bridge rectifier circuit comprised of a plurality of field-effect transistors connected to automatically provide a predetermined voltage polarity at said pair of output lines regardless of a voltage polarity applied at said pair of input lines coupled to a power supply;

a voltage divider provided for each of said plurality of field-effect transistors, said voltage divider comprised of a first resistor connected between sources of at least two of said field-effect transistors and a gate of a first one of said at least two field-effect transistors and a second resistor connected in series with said first resistor from said sources of said at least two field-effect transistors directly to a first input line of said input lines, wherein said first input line has a first voltage polarity opposite a second voltage polarity of a second input line of said input lines, and said second input line is directly connected to a drain of said first one of said at least two field-effect transistors;

a bias voltage tap defined at a connection point between said first and second resistors connected to said gate of each of said field-effect transistors; and a plurality of voltage clamping devices, each respectively connected between said gate and said source of one of said first, second, third and fourth field-effect transistor, wherein each of said voltage clamping devices performs a dual function of providing protection to said gate of each respective one of said field-effect transistors, and allowing an adequate bias voltage level to be developed between said gate and said source of said respective field-effect transistor when a voltage across said input lines is less than a predetermined value;

wherein each of said plurality of field-effect transistors is a power MOSFET that is self biased through an intrinsic body diode, said intrinsic body diodes of the field-effect transistors arranged (a) to allow first and fourth field-effect transistors of said plurality of field-effect transistors to turn on at a first polarity state of an input voltage source while blocking bias currents for second and third field-effect transistors at said first polarity state, and (b) to allow said second and third field-effect transistors of said plurality of field-effect transistors to turn on at a second polarity state of said input voltage source while blocking bias currents for said first and fourth field-effect transistors at said second polarity state.

8. The transistor active bridge circuit of claim 7, wherein said voltage clamping device comprises a zener diode connected between said gate and said source of each respective one of said field-effect transistors.

9. The transistor active bridge circuit of claim 7, wherein said bridge rectifier circuit is comprised of first and second field-effect transistors of a first channel type, and third and fourth field-effect transistors of a second channel type; and wherein a source-drain path of said first field-effect transistor is connected in series with a source-drain path of said second field-effect transistor to form a first series transistor combination connected across said input lines, and a source-drain path of said third field-effect transistor connected in series with a source-drain path of said fourth field-effect transistor form a second series transistor combination connected across said input lines.

10. The transistor active bridge circuit of claim 7, wherein a drain of each one of said field-effect transistors is connected to a first one of said input lines, said source of each one of said field-effect transistor is connected to said first resistor, and said second resistor is connected to a second one of said input lines.

* * * * *